H. W. JOY.
CINEMATOGRAPH MACHINE.
APPLICATION FILED JUNE 16, 1916.
1,250,186.
Patented Dec. 18, 1917.
5 SHEETS—SHEET 2.
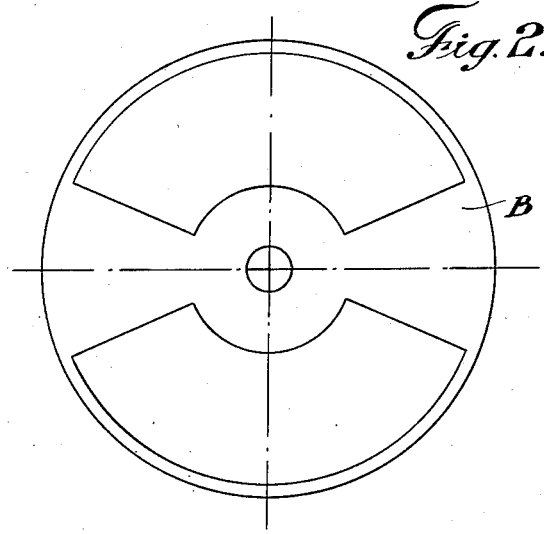
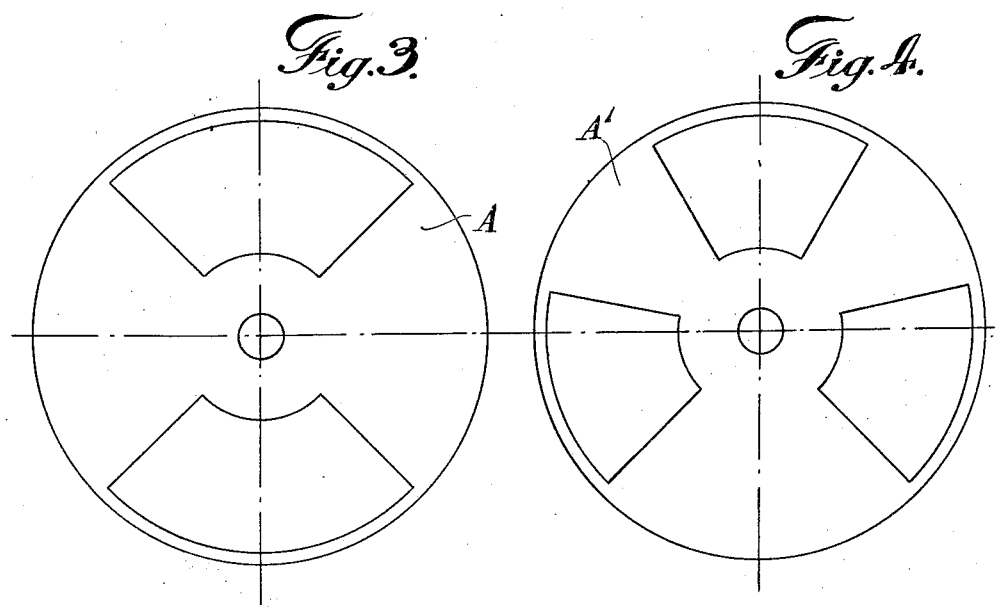

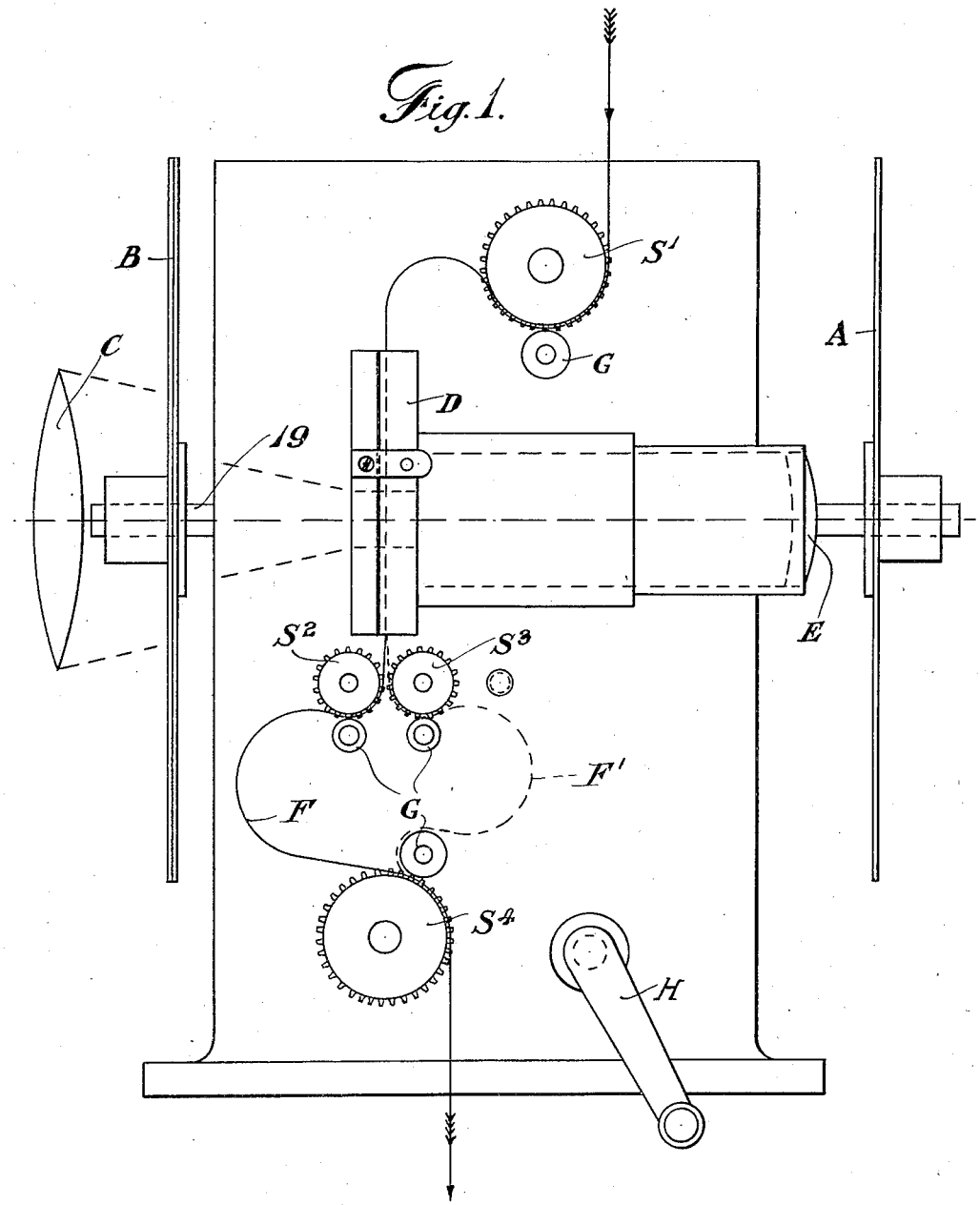

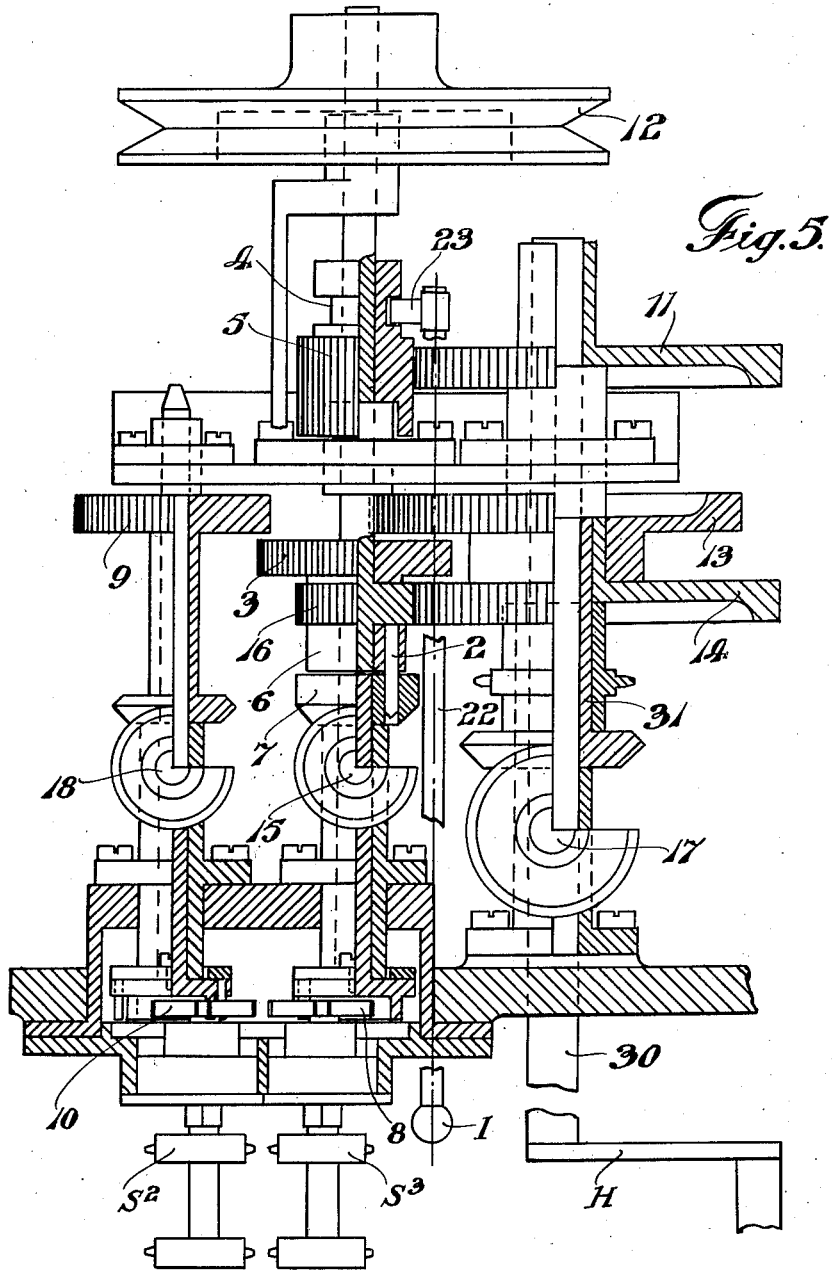

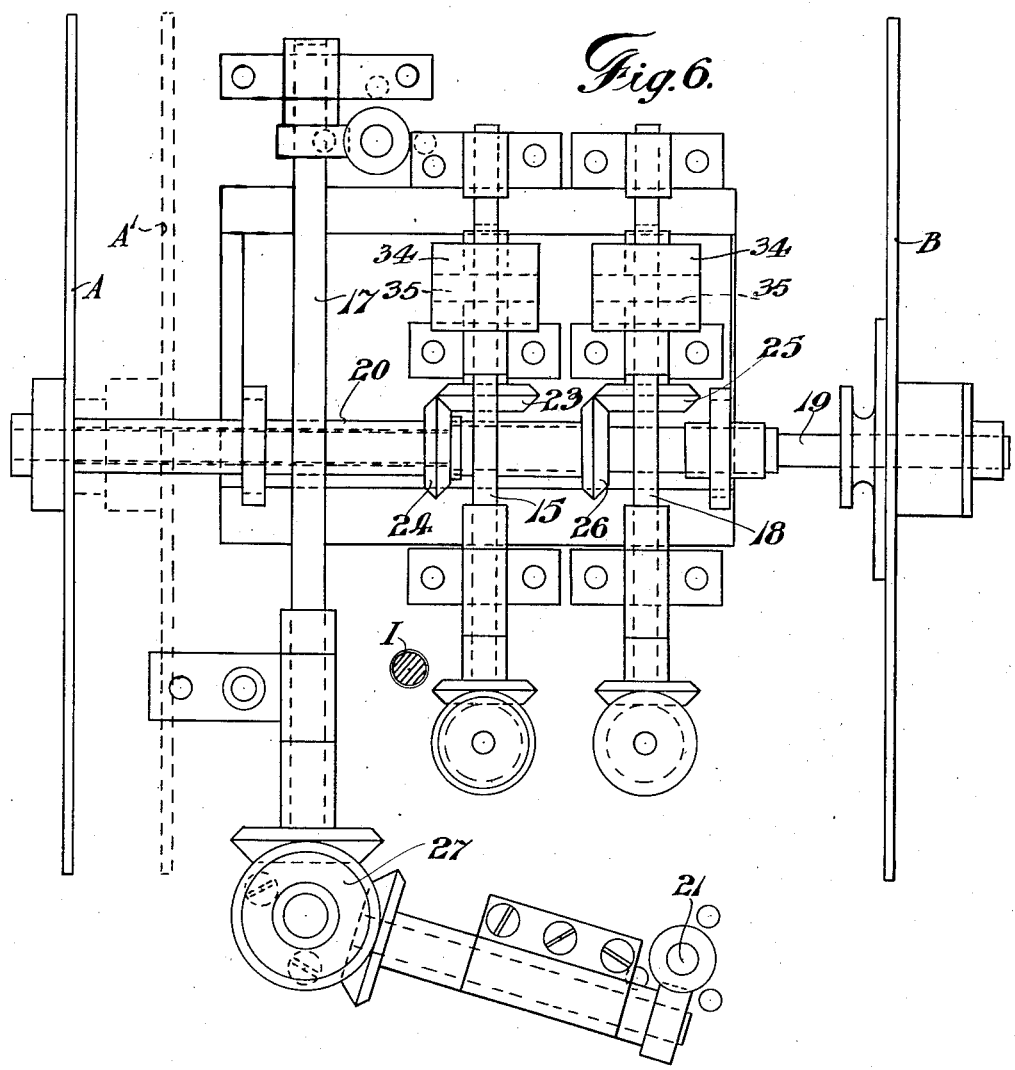

H. W. JOY.
CINEMATOGRAPH MACHINE.
APPLICATION FILED JUNE 16, 1916.
1,250,186.
Patented Dec. 18, 1917.
5 SHEETS—SHEET 5.
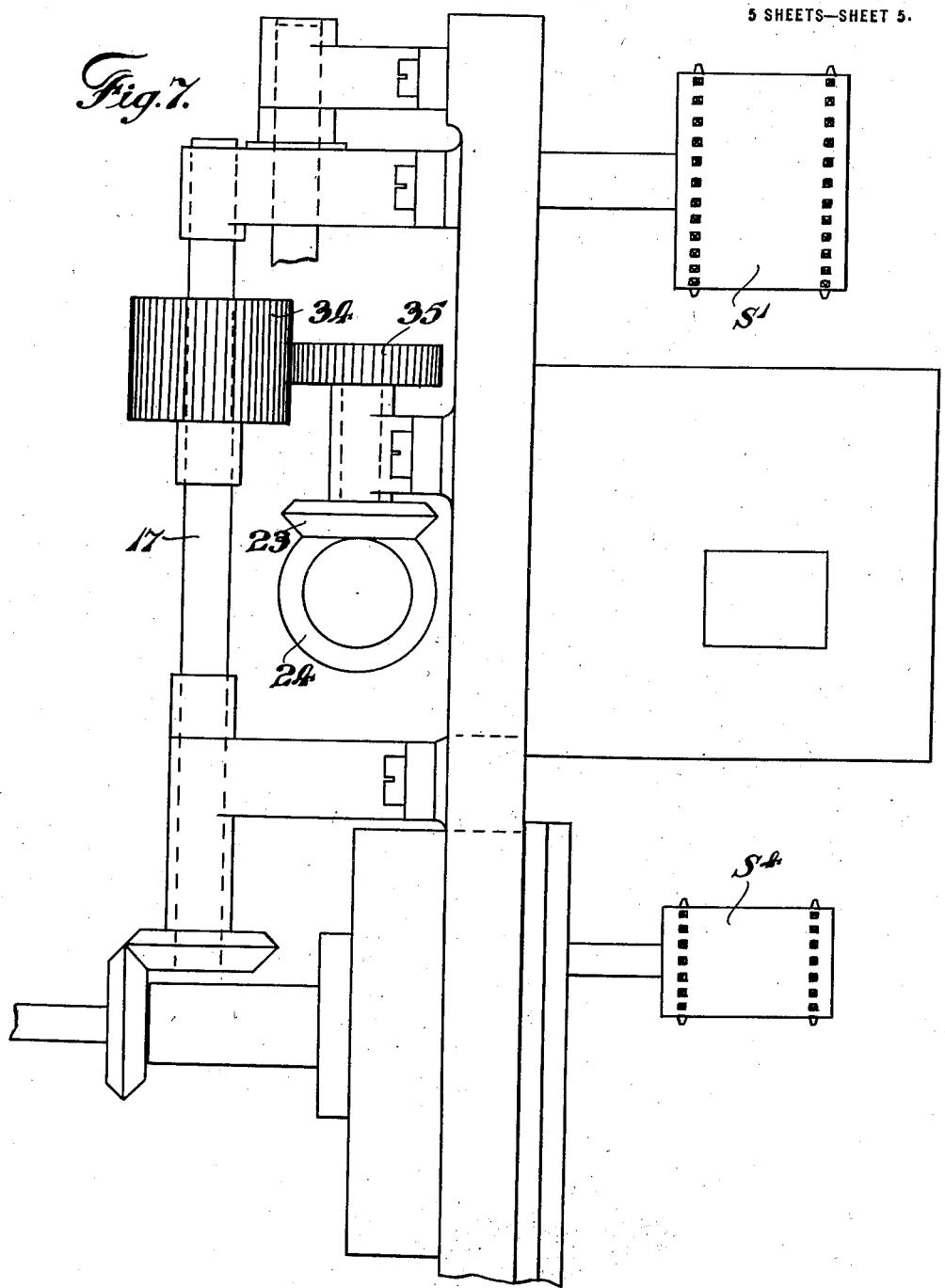

UNITED STATES PATENT OFFICE.

HENRY WILLIAM JOY, OF COBHAM, ENGLAND.

CINEMATOGRAPH-MACHINE.

1,250,186.
Specification of Letters Patent.
Patented Dec. 18, 1917.

Application filed June 16, 1916. Serial No. 104,060.

*To all whom it may concern:*

Be it known that I, HENRY WILLIAM JOY, residing at 3 Woodside Cottages, Fairmile Park, Cobham, Surrey, England, have invented certain new and useful Improvements in and Relating to Cinematograph-Machines; and I do hereby declare the following to be a full, clear, and exact description of the invention, such as will enable others skilled in the art to which it appertains to make and use the same.

This invention relates to cinematograph projectors, and its object is to provide a projector capable of use for projecting at will either black and white pictures or natural color pictures.

It is well known that in order to be able successfully to project cinematograph pictures by the two-color process it is necessary to run the film at a higher rate of speed than is usual for black and white pictures, as successful projection in natural colors or approximately natural colors depends on the fusion of the colors produced by rapidly alternating color records.

When an ordinary black and white cinematograph projector is used for projecting pictures in natural colors or approximately natural colors it is invariably found that the excessive speed of the intermittently moving film and also the intermittent mechanism itself has a disastrous effect due primarily to the increased arresting pressure upon the film the latter being necessary to prevent overfeeding in the exposure aperture. The result is that the film rapidly gets damaged and breaks up, and the intermittent mechanism itself quickly becomes untrue and frequently also breaks.

It has therefore been proposed for the purpose of natural color cinematograph projection to use what is known as a 2-pin Maltese cross action. This mechanism permits of a high rate of speed in projection being used owing to the fact that two pictures are fed in the space of time which is ordinarily occupied by feeding one picture where the single pin Maltese cross action is used. The 2-pin mechanism does not require extra retarding tension on the film as although it is made to pull down twice the ordinary number of pictures in a given period of time yet the rate of change or time occupied in displacing each picture is identical in the two instances, and the number of revolutions per minute would be the same in both cases.

It has, however, been found that these two pin projectors of the kind described are not suitable for projecting cinematograph pictures at normal speeds, such as are used for black and white work. The reason for this would be obvious, as if the speed be lessened to half it follows that the consequent rate of change or displacement will be double and the two-pin projector if used for normal speeds would require an obliterating shutter of double the covering or cutting off area to that which is necessary with the ordinary single pin projector. This fact would destroy the effect of the pictures to the spectator and the use of the two-pin projectors for ordinary black and white cinematography has long since been abandoned. For these reasons it has not been possible to use an ordinary single pin projector such as is usually used for black and white work for the purpose of projecting high speed natural color pictures, neither has it been possible to use the two-pin projector for the normal speed of black and white work, and it has in fact been necessary to have separate projectors for natural color and black and white.

The object of this invention is to avoid the present costly and inconvenient necessity of having two separate projectors by providing a new and improved projector capable of working satisfactorily, and at the will of the operator, either the black and white at the normal or natural color at the increased speed.

The invention is carried out as follows and is illustrated in the accompanying drawings in which:—

Figure 1 is a diagrammatic view of the black and white and colored film feeding mechanisms.

Fig. 2 is a face view of the usual type of color filter employed for two color projection.

Fig. 3 is a face view of the usual type of shutter or obliterator used in two color projection.

Fig. 4 is a face view of the usual type of shutter or obliterator used for monochromatic or black and white projection.

Fig. 5 is a part sectional plan showing a preferred form of gearing for changing the speed of film feeding and taking up sprockets, as well as for driving at will either the black and white or the color intermittent gearing.

Fig. 6 shows in elevation a preferred form of mechanism for transmitting the required motion from the gearing shown in Fig. 5 to the shutter gearing, and, Fig. 7 shows the gear transmission for the shutter shaft.

Referring to the drawings Fig. 1 is a diagrammatic illustration of the film feeding mechanism for a projector constructed according to this invention with a two color natural color positive film F in position. The usual two color filter B (see Fig. 2) and twin opening light obliterating shutter A (Fig. 3) are shown in their proper positions mounted on the shaft 19. The usual condenser C is provided throwing the light from the arc or other source of light upon the exposure hole in the film gate or door D, whence the light travels through the ordinary projecting lens E. The color film F, shown in position travels in the direction indicated by the arrows from the feed sprocket $S_1$ over the color intermittent driving sprocket $S_2$ to the take-up sprocket $S_4$, being kept in position by the pressure rollers G. The intermittent sprocket $S_2$ operates together with a two pin Maltese cross mechanism designed to give two feeding impulses in place of the usual one impulse, and this sprocket is used only for natural color projection. $S_3$ indicates the black and white or monochromatic intermittent sprocket which operates in conjunction with a single pin Maltese cross mechanism giving the usual single feed impulse, and this sprocket is used exclusively for black and white projection. Where the projector is used for black and white work the film travels in the manner shown by the dotted line $F_1$. It will be seen that whereas two sets of intermittent sprockets $S_2$ and $S_3$ with their pressure rollers G are provided for the two speeds of projection, the feed sprocket $S_1$ and the take up sprocket $S_4$, are common to both mechanisms although the speed at which these two latter are driven will of course have to be varied in the manner to be described. H indicates a handle for driving the projector manually, while the gear changing knob for changing from the black and white gear to the color gear, or vice versa. is shown at I.

Should it be desired to use the projector for monochromatic or black and white work it will only be necessary to remove the color filter B and substitute the black and white shutter $A_1$ (see Fig. 4) for the color shutter A, and for this purpose a concentrically driven shaft 20 (see Fig. 6) is provided; further, the film must be threaded from the feed sprocket $S_1$ through the gate D over the intermittent sprocket $S_3$ to the take up sprocket $S_4$, and the gear must be changed by means of the knob I.

The gear changing mechanism will now be described in detail, reference being made particularly to Figs. 5, 6 and 7. The objects of this mechanism are firstly to drive at will either the two-pin or natural color cam 10 (Fig. 5) and its intermittent sprocket $S_2$ or the single pin or black and white cam 8 and sprocket $S_3$, secondly to drive the shutter and color filter shafts synchronously with whichever of the sprockets $S_2$ and $S_3$ is in operation, and thirdly, to drive the film feeding sprocket $S_1$ and take sprocket $S_4$ at the correct speed for either color or black and white projection. In Fig. 5 the monochromatic or black and white gear is shown in mesh with the train. By rotating the handle H motion is imparted to the spur wheel 11 in mesh with the spur wheel 5 fast with the high speed slidable shaft 6, said shaft being also capable, if desired, of being driven by means of the belt pulley 12 or in any other suitable manner. The shaft 6 transmits its motion as required to either of the intermittent sprockets $S_2$ or $S_3$ as well as to the ratio changing spur wheels 13 and 14, whichever is in mesh for the purpose of driving the vertical feed sprocket shaft 17 synchronously with the intermittent mechanism in operation. In the position shown in Fig. 5, the single pin cam 8 and sprocket $S_3$ are being driven by means of the clutch pin 2 engaging the miter wheel 7. The low ratio pinion 16 secured to the sliding shaft 6 is shown in mesh with the driven spur wheel 14 by means of which it transmits the correct speed of rotation to the vertical feed sprocket shaft 17, which drives the feed sprocket $S_1$. The vertical black and white shutter shaft is shown at 15 and is adapted to be driven by means of the miter gearing 7 above referred to.

For the purpose of changing over to the color gear the knob I is provided, this knob forming the dead end of a connecting rod 22 holding a fork 23 in engagement with the turned recess 4 forming part of the pinion 5, which latter as stated is secured to the slidable shaft 6. The pinion 5 is of double the normal width so that whichever position it may be in it will always be in mesh with the spur wheel 11. If now the knob I be pushed inward the connecting pin 2 will be thrown out of engagement with the miter clutch 7 and the single pin cam 8, sprocket $S_3$ and the vertical black and white shutter shaft 15 will consequently stand idle; similarly the pinion 16 will no longer be in mesh with the low speed spur wheel 14. The transmission pinion 3, however, will now come into mesh with the color spur wheel 9 whereby the two pin cam 10 and sprocket $S_2$ will be operated. The vertical color shutter shaft 18 will now also be operated by means of the miter gearing shown. At the same time the pinion 3 will also engage the high speed spur wheel 13

13 which is fast on the sleeve 31, said sleeve also carrying the low speed spur wheel 14 above referred to. It follows that the feed sprocket shaft 17 will now be driven at the higher speed necessary for color projection, it being of course understood that the gear ratios between the two trains of wheels from the pinion 3 to the spur wheels 13 and 9 on the one hand, and from the pinion 16 to the spur wheel 14 on the other hand, are suitably arranged for the speeds necessary for color and black and white projection respectively. It will be seen therefore that by changing the gears from the position shown in Fig. 5 the single pin cam and sprocket are left idle, while the two-pin cam and sprocket are operated for color projection, the shutter shafts and feed sprocket shafts being driven at the correct speeds for color projection.

In Fig. 6 is shown one method of transmitting the required motion to the shutter gearing. For this purpose two horizontal shutter shafts are arranged concentrically;
the one marked 19 which in addition to the shutter marked A, also carries the color filter B at its opposite and remote extremity. The monochromatic or black and white shutter shaft is arranged concentrically to the shaft 19, and is indicated by the number 20. The said hollow shaft 20 carries the black and white shutter A' and is driven from the vertical shaft 15 by means of the miter wheels 23 and 24 through the intermediate spur gears shown in Fig. 7 as 34 and 35. The color shaft 19 is driven from the vertical shaft 18 (Fig. 6) by means of the miter wheels 25 and 26 through intermediate spur gears similar to 34 and 35, which gears do not appear in the drawing,—Fig. 7, by virtue of same being in absolute superimposition to the gears marked 34 and 35. Fig. 6 also shows how motion from the vertical feed sprocket shaft 17 may be transmitted to the feed sprocket $S_1$ (Fig. 1) and the take up sprocket $S_4$ (Fig. 1). 21 (Fig. 6) indicates the shaft holding the take up sprocket.

The invention is not limited to the use of the Maltese cross type of intermittent mechanism as it is obvious that the driving and gear changing devices could easily be varied to suit any other form of intermittent gearing. Similarly the various transmission devices can be altered within reasonable limits without departing from the spirit of the invention, which it is considered resides in the combination in one projector of two separate intermittent mechanisms with means for throwing either of them at will into mesh with the drive and in providing suitable means for synchronizing the movement of the feed and take-up sprockets and shutter mechanism with whichever intermittent mechanism is in operation. One form only, which is the preferred form of carrying out the above object has been described and illustrated in this specification.

I claim:—

1. A projector for cinematograph pictures having in combination two separate intermittent film feeding mechanisms, one adapted for black and white projection, the other for projection in natural colors, a single set of feed sprockets and take-up sprockets for use with both said intermittent mechanisms at different desired times, and means for throwing either of said mechanisms into engagement with the driving mechanism to the exclusion of the other, and means for synchronizing the motion of the film feeding and taking up sprockets with that of whichever intermittent mechanism is in operation.

2. A projector for cinematograph pictures comprising in combination two separate intermittent film feeding mechanisms, one adapted for black and white projection, the other for projection in natural colors, a single set of feeding sprockets and take-up sprockets for use with both said intermittent mechanisms at different times as desired, means for throwing either of said mechanisms into engagement with the driving mechanism to the exclusion of the other intermittent mechanism, means for synchronizing the motion of the film feeding and taking up sprockets with that of whichever intermittent mechanism is in operation, and means for synchronizing the motion of the shutter with that of whichever intermittent mechanism is in operation.

3. A projector for cinematograph pictures having in combination two separate intermittent film feeding mechanisms, one adapted for black and white projection, the other for projection in natural colors, a single set of feeding sprockets and take-up sprockets for use with both said intermittent mechanisms at different times as desired, means for throwing either of said mechanisms into engagement with the driving mechanism to the exclusion of the other intermittent mechanism, said black and white and color intermittent mechanisms actuating separate sprockets for black and white or natural color film projection respectively, and means whereby the film feed sprocket and the take up sprocket are driven at proportional speeds according to whether black and white or natural color pictures are being projected.

4. A projector for cinematograph pictures comprising in combination two separate intermittent film feeding mechanisms, one adapted for black and white projection, the other for projection in natural colors, a single set of feeding sprockets and take-up sprockets for use with both said intermittent mechanisms at different times as desired, means for throwing either of said mechanisms into engagement with the driving mechanism to the exclusion of the other of said mechanism, a pair of concentrically arranged shafts, said black and white intermittent mechanism and the color intermittent mechanism each when in operation being actuated by one of said concentrically arranged shafts, and a removable color filter and color shutter carried on one of said concentric shafts, whereby a black and white shutter may be mounted on the second shaft when the gears are changed to run at a speed suitable for projecting black and white pictures.

5. A projector for cinematograph pictures having in combination two separate intermittent film feeding mechanisms, one adapted for black and white projection, the other for projection in natural colors, a single set of feeding sprockets and take-up sprockets for use with both said intermittent mechanisms at different times as desired, means for throwing either of said mechanisms into engagement with the driving mechanism to the exclusion of the other of said mechanisms, a pair of concentric shutter shafts, a second pair of shafts having driving connections with said concentric shutter shafts, and a third pair of shafts for said black and white and natural color mechanisms respectively having driving connections with said second pair of shafts, and means for connecting said third pair of shafts with driving mechanism operable by hand or power.

6. A projector for cinematograph pictures having in combination two separate intermittent film feeding mechanisms, one adapted for black and white projection, the other for projection in natural colors, a single feed sprocket shaft adapted for use with both of said intermittent mechanisms at different desired times, means for throwing either of said mechanisms into engagement with the driving mechanism to the exclusion of the other of said mechanisms, a pair of concentric shutter shafts, a second pair of shafts having driving connections with said concentric shutter shafts, and a third pair of shafts for said black and white and natural color mechanisms respectively having driving connections with said second pair of shafts, and means for connecting said third pair of shafts with driving mechanism operable by hand or power, said last mentioned means comprising a slidable shaft having two pinions thereon of different size, a low speed spur wheel for meshing with one of said pinions, but intermediate said pinion meshing with the low speed spur wheel for transmitting motion to the black and white intermittent mechanism, a high speed spur wheel for meshing with the second and larger of said pinions and with a pinion on the shaft of the color intermittent mechanism, said high and low speed spur wheels being adapted to transmit motion to the feed sprocket shaft in proportion to the speed of the intermittent mechanisms.

7. A projector for cinematograph pictures having in combination two separate intermittent film feeding mechanisms, one adapted for black and white projection, the other for projection in natural colors, a single set of feeding sprockets and take-up sprockets for use with both said intermittent mechanisms at different desired times, means for throwing either of said mechanisms into engagement with the driving mechanism to the exclusion of the other of said mechanisms, a pair of concentric shutter shafts, a second pair of shafts having driving connections with said concentric shutter shafts, and a third pair of shafts for said black and white and natural color mechanisms respectively having driving connections with said second pair of shafts, and means for connecting said third pair of shafts with driving mechanism operable by hand or power, said last mentioned means comprising a slidable shaft having two pinions thereon of different size, a low speed spur wheel for meshing with one of said pinions, but intermediate said pinion meshing with the low speed spur wheel for transmitting motion to the black and white intermittent mechanism, a high speed spur wheel for meshing with the second and larger of said pinions and with a pinion on the shaft of the color intermittent mechanism, said high and low speed spur wheels being adapted to transmit motion to the feed sprocket shaft in proportion to the speed of the intermittent mechanisms, said sliding shaft also being provided with a wide pinion always in mesh with a spur wheel on the driving shaft, and a lever operable from the exterior of the machine casing for operating said sliding shaft.

8. A projector for cinematograph pictures having in combination two separate intermittent film feeding mechanisms, one adapted for black and white projection, the other for projection in natural colors, a single set of feeding sprockets and take-up sprockets for use with both said intermittent mechanisms at different times as desired, means for throwing either of said mechanisms into engagement with the driving mechanism to the exclusion of the other of said mechanisms, a pair of concentric shutter shafts, a second pair of shafts having driving connection with said concentric shutter shafts, and a third pair of shafts for said black and white and natural color mechanisms respectively having driving connections with said second pair of shafts, and means for connecting said third pair of shafts with driving mechanism operable by hand or power, said last mentioned means comprising a slidable shaft having two pinions thereon of different size, a low speed spur wheel for meshing with one of said pinions, but intermediate said pinion meshing with the low speed spur wheel for transmitting motion to the black and white intermittent mechanism, a high speed spur wheel for meshing with the second and larger of said pinions and with a pinion on the shaft of the color intermittent mechanism, said high and low speed spur wheels being adapted to transmit motion to the feed sprocket shaft in proportion to the speed of the intermittent mechanisms, and a miter gearing between the feed sprocket shaft and the shaft of the take up sprocket whereby the speed of the latter is regulated by the speed of the feed sprocket.

9. A unitary machine for projecting cinematograph pictures having in combination two separate intermittent film feeding mechanisms, one adapted for black and white projection, the other for projection in natural colors, means for throwing either of said mechanisms into engagement with the driving mechanism to the exclusion of the other intermittent mechanism, said black and white and color film feed mechanisms comprising respectively single pin and two pin Maltese cross intermittent feed arrangements, and a single set of feed and take-up sprockets for use with both said intermittent mechanisms at different times as desired.

10. A machine for projecting cinematograph pictures comprising in combination two intermittent film feeding mechanisms, one of said mechanisms including a single pin Maltese cross drive and the other said mechanisms including a two pin Maltese cross drive, means whereby said drive may be driven at the same rotating speed but one at a time only, a single set of feeding and take-up sprockets for use with both of said intermittent mechanisms, whichever one may be operating, and means whereby said feeding and take-up sprockets are driven at a higher rate of speed when said double pin mechanism is operating.

In testimony whereof I affix my signature in presence of two witnesses.

HENRY WILLIAM JOY.

Witnesses:
 FRANK B. DEHN,
 A. R. J. RAMSEY.